(12) United States Patent
Tsuchida et al.

(10) Patent No.: US 8,437,594 B2
(45) Date of Patent: May 7, 2013

(54) HOLEY FIBER

(75) Inventors: Yukihiro Tsuchida, Tokyo (JP); Kazunori Mukasa, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 13/366,408

(22) Filed: Feb. 6, 2012

(65) Prior Publication Data
US 2012/0134636 A1 May 31, 2012

Related U.S. Application Data (63) Continuation of application No. PCT/JP2011/056150, filed on Mar. 16, 2011.

(30) Foreign Application Priority Data

Mar. 16, 2010 (JP) ................................. 2010-059959

(51) Int. Cl.
*G02B 6/032* (2006.01)
(52) U.S. Cl.
USPC ........................................................ 385/125
(58) Field of Classification Search .................. 385/123, 385/125
See application file for complete search history.

(56) References Cited

U.S. PATENT DOCUMENTS

| | | | | |
|---|---|---|---|---|
| 6,826,342 B1 * | 11/2004 | Bise et al. | ...................... | 385/125 |
| 7,463,806 B2 * | 12/2008 | Borrelli et al. | ................ | 385/125 |
| 7,693,378 B2 | 4/2010 | Mukasa | | |
| 7,693,380 B2 | 4/2010 | Mukasa | | |
| 7,903,919 B2 | 3/2011 | Mukasa | | |
| 2008/0199135 A1 * | 8/2008 | Proulx | ........................... | 385/123 |
| 2008/0310806 A1 | 12/2008 | Mukasa | | |
| 2009/0046984 A1 * | 2/2009 | Mukasa | ....................... | 385/125 |
| 2009/0052853 A1 | 2/2009 | Mukasa et al. | | |
| 2009/0180746 A1 | 7/2009 | Mukasa | | |
| 2010/0135628 A1 | 6/2010 | Mukasa | | |
| 2010/0150507 A1 | 6/2010 | Takahashi et al. | | |

(Continued)

FOREIGN PATENT DOCUMENTS

WO WO 2008/093870 A1 8/2008

OTHER PUBLICATIONS

Varallyay et al., "Reversed dispersion slope photonic bandgap fibers for broadband dispersion control in femtosecond fiber lasers", Optics Express, vol. 16, 15603-16 (2008).*

(Continued)

*Primary Examiner* — Charlie Peng
(74) *Attorney, Agent, or Firm* — Oblon, Spivak, McClelland, Maier & Neustadt, L.L.P.

(57) ABSTRACT

A holey fiber includes a core portion located at a center of the holey fiber, and a cladding portion located around the core portion, the cladding portion having holes formed in layers around the core portion. The holes are arranged so as to form a triangular lattice while $d/\Lambda$ is within a range of 0.33 to 0.43, $\Lambda$ is within a range of 10.5 micrometers to 15 micrometers when a hole diameter is d in micrometer and a lattice constant of the triangular lattice is $\Lambda$ in micrometer, and in a wavelength of 1550 nanometer, an effective core-area is equal to or greater than 130 $\mu m^2$, a bending loss in a case of bending the holey fiber at a bend diameter of 20 millimeters is equal to or less than 200 dB/m, and the holey fiber demonstrates a single-mode operation.

8 Claims, 10 Drawing Sheets

U.S. PATENT DOCUMENTS

2011/0026890 A1 2/2011 Takahashi et al.
2011/0091176 A1 4/2011 Takahashi et al.
2011/0094269 A1 4/2011 Mukasa
2012/0033923 A1* 2/2012 Takenaga et al. ............. 385/125

OTHER PUBLICATIONS

Qin et al., "highly nonlinear tellurite microstructured fibers for broadband wavelength conversion and flattened supercontinu um generation", Journal of Applied Physics 107, 043108 (2010).*

U.S. Appl. No. 13/422,937, filed Mar. 16, 2012, Tsuchida, et al.

Kunimasa Saitoh, et al., "Endlessly single-mode holey fibers: the influence of core design," *Optics Express*, vol. 13, No. 26, pp. 10833-10839, Dec. 26, 2005.

K. Nagayama, et al., "Ultra-low-loss (0.1484 dB/km) pure silica core fibre and extension of transmission distance," *Electronics Letters*, vol. 38, No. 20, pp. 1168-1169, Sep. 26, 2002.

Martin D. Nielsen, "Reduced microdeformation attenuation in large-mode-area photonic crystal fibers for visible applications," *Optics Letters*, vol. 28, No. 18, pp. 1645-1647, Sep. 15, 2003.

Anders Bjarklev, et al., "Microbending in photonic crystal fibres—An ultimate loss limit?" *Proceeding of ECOC 2001*, We.L.2.4., 2001.

Kazunori Mukasa, et al., "Comparisons of merits on wide-band transmission systems between using extremely improved solid SMFs with Aeff of 160 $\mu m^2$ and loss of 0.175dB/km and using large-Aeff holey fibers enabling transmission over 600nm bandwidth," *Proceeding of OFC, OThR1*, 2008.

International Search Report mailed Apr. 19, 2011 in PCT/JP2011/056150 filed Mar. 16, 2011 (with English Translation).

U.S. Appl. No. 12/129,257, filed May 29, 2008, Mukasa, et al.
U.S. Appl. No. 12/131,355, filed Jun. 2, 2008, Mukasa.
U.S. Appl. No. 12/406,592, filed Mar. 18, 2009, Mukasa.
U.S. Appl. No. 12/649,388, filed Dec. 30, 2009, Takahashi et al.
U.S. Appl. No. 12/699,916, filed Feb. 4, 2010, Mukasa.
U.S. Appl. No. 12/846,113, filed Jul. 29, 2010, Takahashi, et al.
U.S. Appl. No. 12/893,304, filed Sep. 29, 2010, Mukasa.
U.S. Appl. No. 12/938,104, filed Nov. 2, 2010, Takahashi, et al.
U.S. Appl. No. 13/366,408, filed Feb. 6, 2012, Tsuchida, et al.
U.S. Appl. No. 13/372,044, filed Feb. 13, 2012, Mukasa et al.

* cited by examiner

| ITEM | Λ | d/Λ | NUMBER OF HOLE LAYERS | Aeff | CONFINEMENT LOSS OF LP01 | BENDING LOSS | CONFINEMENT LOSS OF LP11 | WAVELENGTH DISPERSION | DISPERSION SLOPE | DPS |
|---|---|---|---|---|---|---|---|---|---|---|
| UNIT | μm | | | μm² | dB/km | dB/m | dB/m | ps/nm/km | ps/nm²/km | nm |
| CALCULATION EXAMPLE 1 | 8 | 0.43 | 4 | 84.7 | 2.36 × 10⁻² | 2.07 × 10⁻³ | 248 | 30.05 | 0.069 | 436 |
| CALCULATION EXAMPLE 2 | 9 | | | 105.9 | 1.26 × 10⁻² | 2.93 × 10⁻² | 175 | 28.46 | 0.068 | 417 |
| CALCULATION EXAMPLE 3 | 10 | | | 129.6 | 7.91 × 10⁻³ | 1.75 | 124 | 27.29 | 0.068 | 403 |
| CALCULATION EXAMPLE 4 | 11 | | | 155.5 | 4.94 × 10⁻³ | 49.7 | 92.8 | 26.38 | 0.067 | 392 |
| CALCULATION EXAMPLE 5 | 12 | | | 184.3 | 3.66 × 10⁻³ | 190 | 67.1 | 25.68 | 0.067 | 384 |
| CALCULATION EXAMPLE 6 | 13 | | | 215.9 | 2.52 × 10⁻³ | 244 | 48.9 | 25.11 | 0.067 | 377 |
| CALCULATION EXAMPLE 7 | 14 | | | 248.7 | 2.01 × 10⁻³ | 269 | 43.9 | 24.66 | 0.066 | 371 |
| CALCULATION EXAMPLE 8 | 15 | | | 285.4 | 1.45 × 10⁻³ | 296 | 31.3 | 24.28 | 0.066 | 367 |
| CALCULATION EXAMPLE 9 | 16 | | | 322.6 | 1.22 × 10⁻³ | 326 | 27.1 | 23.98 | 0.066 | 363 |
| CALCULATION EXAMPLE 10 | 17 | | | 364.3 | 9.57 × 10⁻⁴ | 360 | 21.9 | 23.71 | 0.066 | 360 |

FIG.5

| ITEM | Λ | d/Λ | NUMBER OF HOLE LAYERS | Aeff | CONFINEMENT LOSS OF LP01 | BENDING LOSS | CONFINEMENT LOSS OF LP11 | WAVELENGTH DISPERSION | DISPERSION SLOPE | DPS |
|---|---|---|---|---|---|---|---|---|---|---|
| UNIT | $\mu m$ | | | $\mu m^2$ | dB/km | dB/m | dB/m | ps/nm/km | ps/nm$^2$/km | nm |
| CALCULATION EXAMPLE 11 | 10 | 0.51 | 4 | 112.1 | $9.56 \times 10^{-6}$ | $3.50 \times 10^{-5}$ | $2.01 \times 10^{-2}$ | 28.10 | 0.068 | 412 |
| CALCULATION EXAMPLE 12 | 11 | | | 133.9 | $7.19 \times 10^{-6}$ | $2.19 \times 10^{-2}$ | $1.86 \times 10^{-2}$ | 27.09 | 0.068 | 400 |
| CALCULATION EXAMPLE 13 | 12 | | | 158.3 | $5.20 \times 10^{-6}$ | $3.82 \times 10^{-1}$ | $1.14 \times 10^{-2}$ | 26.28 | 0.067 | 391 |
| CALCULATION EXAMPLE 14 | 13 | | | 185.0 | $3.96 \times 10^{-6}$ | 3.09 | $7.03 \times 10^{-3}$ | 25.64 | 0.067 | 383 |
| CALCULATION EXAMPLE 15 | 14 | | | 215.3 | $2.86 \times 10^{-6}$ | 10.6 | $5.55 \times 10^{-3}$ | 25.10 | 0.067 | 376 |
| CALCULATION EXAMPLE 16 | 15 | | | 244.6 | $2.09 \times 10^{-6}$ | 98.3 | $3.47 \times 10^{-3}$ | 24.69 | 0.066 | 372 |
| CALCULATION EXAMPLE 17 | 16 | | | 277.7 | $1.81 \times 10^{-6}$ | 389 | $3.65 \times 10^{-3}$ | 24.33 | 0.066 | 367 |

FIG.6

| ITEM | Λ | d/Λ | NUMBER OF HOLE LAYERS | Aeff | CONFINEMENT LOSS OF LP01 | BENDING LOSS | CONFINEMENT LOSS OF LP11 | WAVELENGTH DISPERSION | DISPERSION SLOPE | DPS |
|---|---|---|---|---|---|---|---|---|---|---|
| UNIT | μm | | | μm² | dB/km | dB/m | dB/m | ps/nm/km | ps/nm²/km | nm |
| CALCULATION EXAMPLE 18 | 10 | 0.51 | 3 | 111.2 | $2.53 \times 10^{-2}$ | $2.30 \times 10^{-3}$ | 0.879 | 28.14 | 0.068 | 412 |
| CALCULATION EXAMPLE 19 | 11 | | | 134.7 | $1.69 \times 10^{-2}$ | $6.40 \times 10^{-3}$ | 0.461 | 27.08 | 0.068 | 400 |
| CALCULATION EXAMPLE 20 | 12 | | | 158.3 | $1.20 \times 10^{-2}$ | $3.36 \times 10^{-1}$ | 0.488 | 26.28 | 0.067 | 391 |
| CALCULATION EXAMPLE 21 | 13 | | | 185.1 | $9.17 \times 10^{-3}$ | 1.88 | 0.399 | 25.64 | 0.067 | 383 |
| CALCULATION EXAMPLE 22 | 14 | | | 215.4 | $6.85 \times 10^{-3}$ | 47.3 | 0.232 | 25.10 | 0.067 | 376 |
| CALCULATION EXAMPLE 23 | 15 | | | 244.6 | $5.68 \times 10^{-3}$ | 105 | 0.230 | 24.69 | 0.066 | 372 |
| CALCULATION EXAMPLE 24 | 16 | | | 278.0 | $4.36 \times 10^{-3}$ | 202 | 0.162 | 24.33 | 0.066 | 367 |

| ITEM | TYPE | d/Λ | Λ | EXTERNAL DIAMETER | NUMBER OF HOLE LAYERS | λc | BENDING LOSS | WAVELENGTH DISPERSION | DISPERSION SLOPE | Aeff | PMD | MICROBENDING LOSS | |
|---|---|---|---|---|---|---|---|---|---|---|---|---|---|
| | | | | | | | | | | | | FIRST MEASUREMENT METHOD | SECOND MEASUREMENT METHOD |
| UNIT | | | μm | μm | | μm | dB/m | ps/nm/km | ps/nm²/km | μm² | Ps/rkm | dB/km | |
| EXAMPLE 1 | HF | 0.43 | 10.5 | 186 | 5 | ESM | 53.3 | 27.03 | 0.068 | 131.5 | 0.164 | 0.32 | 0.13 |
| EXAMPLE 2 | HF | 0.34 | 10.2 | 186 | 5 | ESM | 157.6 | 26.02 | 0.067 | 154.9 | 0.582 | 0.98 | 0.30 |
| EXAMPLE 3 | HF | 0.43 | 10.6 | 215 | 5 | ESM | 49.5 | 26.69 | 0.068 | 142.1 | 2.013 | 0.11 | 0.02 |
| EXAMPLE 4 | HF | 0.43 | 10.9 | 186 | 5 | ESM | 57.2 | 26.65 | 0.067 | 150.0 | 0.614 | 0.31 | 0.16 |
| EXAMPLE 5 | HF | 0.43 | 10.9 | 186 | 4 | ESM | 45.0 | 26.66 | 0.068 | 150.0 | 0.951 | 1.29 | 1.04 |
| EXAMPLE 6 | HF | 0.43 | 10.9 | 161 | 4 | ESM | 68.3 | 26.38 | 0.067 | 150.0 | 0.289 | 1.67 | 0.53 |
| EXAMPLE 7 | HF | 0.45 | 11.4 | 186 | 4 | 1.14 | 47.3 | 26.08 | 0.067 | 150.0 | 0.181 | 0.75 | 0.28 |
| REFERENCE EXAMPLE 1 | SIF | - | - | 186 | - | 1.508 | 18.4 | 19.95 | 0.059 | 114.2 | 0.059 | 0.18 | 0.10 |
| REFERENCE EXAMPLE 2 | SIF | - | - | 186 | - | 1.437 | 107.2 | 20.04 | 0.060 | 130.0 | 0.095 | 0.44 | 0.04 |

HOLEY FIBER

CROSS-REFERENCE TO RELATED APPLICATIONS

This application is a continuation of PCT International Application No. PCT/JP2011/056150 filed on Mar. 16, 2011 which claims the benefit of priority from the prior Japanese Patent Applications No. 2010-059959, filed on Mar. 16, 2010; the entire contents of which are incorporated herein by reference.

BACKGROUND OF THE INVENTION

1. Field of the Disclosure

The present invention relates to a holey fiber.

2. Description of the Related Art

A holey fiber (HF) or a photonic crystal fiber is a new type of optical fiber which realizes optical transmission using the principle of total reflection while reducing an average refractive index by having holes arranged regularly in a cladding layer. By using holes for controlling refractive index of optical fiber, the holey fiber can realize unique characteristics which have not been able to be realized by a conventional optical fiber, such as an endlessly single mode characteristic (ESM) and a zero-dispersion wavelength shifted toward a side of an extremely short wavelength. The ESM indicates an absence of cut-off wavelength, and it is a characteristic that enables optical transmission with high transmission rate over a wide band (cf. "Endlessly single-mode holey fibers: the influence of core design," Optics Express, vol. 13, pp. 10833-10839 (2005) (hereinafter to be referred to as Nonpatent Reference 1), by K. Saitoh, Y. Tsuchida, M. Koshiba, and N. A. Mortensen).

The holey fiber is also expected to be applied to a transmission medium with low optical nonlinearity for use in optical transmission and a fiber laser.

That is, in the optical transmission, for instance, especially in a case of conducting a long-distance terrestrial transmission or an undersea transmission, there is a problem in that a nonlinear optical phenomenon of optical fiber being the transmission medium becomes a major obstacle in conducting the long-distance and high-speed transmission. As a method for solving such problem, use of a large-effective-area (large-Aeff) optical fiber as a transmission medium has been proposed. The large-Aeff optical fiber has a structure in that an effective core-area (Aeff) is enlarged by expanding a core diameter in the optical fiber to be larger than that of the normal optical fiber in order to reduce the optical nonlinearity. For example, "Ultra-low-loss (0.1484 dB/km) pure silica core fiber and extension of transmission distance," Electronics Letters, vol. 38, pp. 1168-1169 (2002) (hereinafter to be referred to as Nonpatent Reference 2), by K. Nagayama, M. Kakui, M. Matsui, T. Saitoh, and Y. Chigusa, and "Comparisons of merits on wide-band transmission systems between Using extremely improved solid SMFs with Aeff of 160 um$^2$ and loss of 0.175 dB/km and Using large-Aeff holey fibers enabling transmission over 600 nm bandwidth," Proceeding of OFC 2008, OThR1 (hereinafter to be referred to as Nonpatent Reference 3), by K. Mukasa, K. Imamura, R. Sugizaki, and T. Yagi, discloses an optical fiber of which Aeff is enlarged to 118 μm$^2$ or 160 μm$^2$ in a normal solid optical fiber without having holes formed inside.

However, the solid optical fiber has a problem in that the macrobending loss (bending loss) increases as the Aeff expands. The bending loss is defined as a fundamental propagation mode of light in a case where the optical fiber is bent with a predetermined bend diameter from a state being straight, i.e. the bending loss is defined as an increase amount of transmission loss of LP01 mode.

Such increase of the bending loss can be suppressed by elongating the cut-off wavelength of the optical fiber. However, in order to make an optical fiber operate so that light propagates at a single-mode, there is a restriction in which cut-off wavelength of the optical fiber should be made shorter than a wavelength of the propagating light. Accordingly, the conventional solid optical fiber exhibits a trade-off relationship among realization of low optical nonlinearity (realization of large-Aeff), realization of single-mode operation, and suppression of bending loss.

On the other hand, since the holey fiber can obtain the ESM characteristic, the holey fiber is expected to be able to relax the restriction caused by the trade-off relationship so as to realize the low optical nonlinearly and suppress the bending loss while realizing the single-mode operation.

The solid optical fiber also exhibits a trade-off relationship among realization of large-Aeff, realization of single-mode, and suppression of microbending loss. The microberding loss is defined as an increase amount of transmission loss of LP01 mode due to the optical fiber bending in minute scales due to minute roughness, or the like, on a surface of a bobbin as the optical fiber is wound around the bobbin. In "Reduced micro-deformation attenuation in large-mode-area photonic crystal fibers for visible applications," Optics Letters, vol. 28, pp. 1645-1647 (2003) (hereinafter to be referred to as Nonpatent Reference 4), by M. D. Nielsen, N. A. Mortensen, and J. R. Folkenberg, and "Microbending in photonic crystal fibers—an ultimate loss limit?," Proceeding of ECOC 2001, We. L. 2. 4. (hereinafter to be referred to as Nonpatent Reference 5), by A. Bjarklev, T. P. Hansen, K. Hougaard, S. B. Libori, E. Knudsen, and J. Broeng, characteristics of the microbending loss of both the holey fiber and the normal solid optical fiber are disclosed. Nonpatent References 4 and 5 relate to theoretical evaluations of the characteristics of the holey fiber and an application of high-power delivery of the holey fiber.

Nonpatent Reference 4 discloses a high power delivery in a visual light range, but does not refer to transmission application. Nonpatent Reference 5 refers to only one type of cross-sectional structure of a holey fiber, and does not specify a cross-sectional structure which is able to sufficiently reduce the microbending loss.

SUMMARY OF THE INVENTION

It is an object of the present invention to at least partially solve the problems in the conventional technology.

According to an aspect of the present invention, there is provided a holey fiber including a core portion located at a center of the holey fiber, and a cladding portion located around the core portion, the cladding portion having holes formed in layers around the core portion. The holes are arranged so as to form a triangular lattice while d/Λ is within a range of 0.33 to 0.43, Λ is within a range of 10.5 micrometers to 15 micrometers when a hole diameter is d in micrometer and a lattice constant of the triangular lattice is Λ in micrometer, and in a wavelength of 1550 nanometer, an effective core-area is equal to or greater than 130 μm$^2$, a bending loss in a case of bending the holey fiber at a bend diameter of 20 millimeters is equal to or less than 200 dB/m, and the holey fiber demonstrates a single-mode operation.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE INVENTION

In recent years, there has been a strong demand for a holey fiber that can realize lower optical nonlinearity and more suppressed bending loss than a conventional fiber while realizing a single-mode operation, for application to optical transmission.

In the following, an embodiment of a holey fiber suitable to be used in optical transmission will be described in detail with reference to the accompanying drawings. The holey fiber according to the embodiment can realize low optical nonlinearity and suppressed bending loss while realizing a single-mode operation. The present invention is not limited to this preferred embodiment. The holey fiber is described as "HF" herein, accordingly. In this description, a cut-off wavelength (λc) indicates a fiber cut-off wavelength as defined in ITU-T (International Telecommunication Union) G.650.1. The terms not particularly defined in the present specification follow the definitions and measuring methods according to the ITU-T G.650.1.

Figure 1:
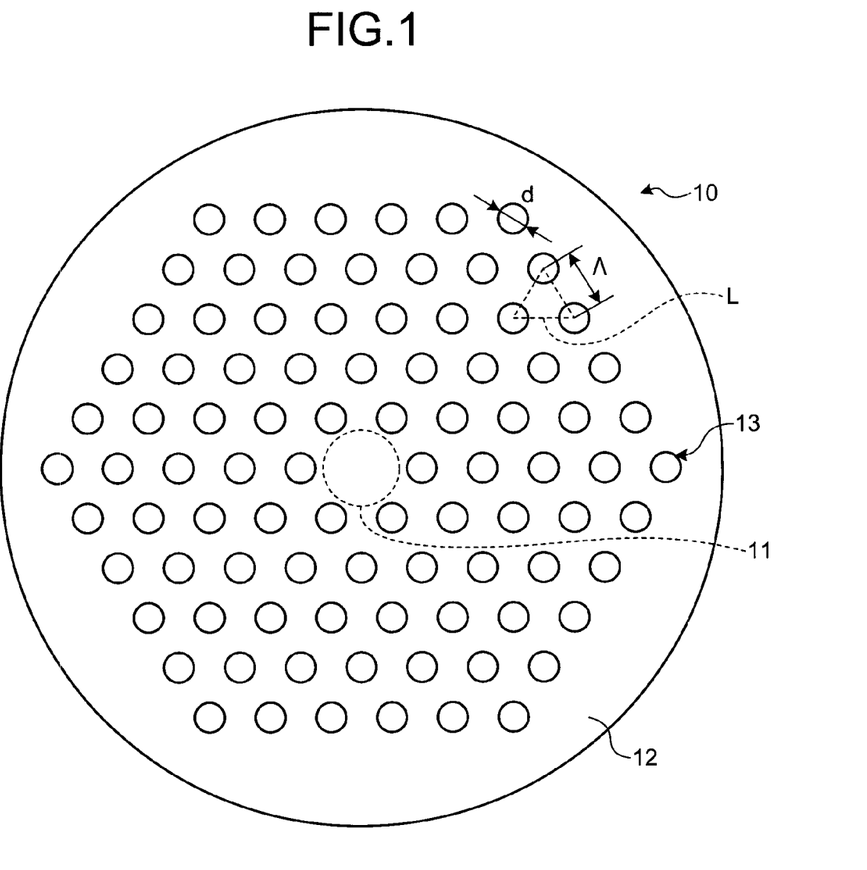
FIG. 1 is a schematic cross-sectional view of an HF according to an embodiment of the present invention.

FIG. 1 is a schematic cross-sectional view of an HF according to an embodiment of the present invention. As shown in FIG. 1, an HF 10 has a core portion 11 located at a center of the HF 10, and a cladding portion 12 located around the core portion 11. Both the core portion 11 and the cladding portion 12 are made of pure silica glass without dopants for adjustment of refraction index.

The cladding layer 12 has holes 13 formed in layers around the core portion 11. If a set of the holes 13 arranged on each apex and each side of a regular hexagon of which center corresponds with the core portion 11 is considered as a single layer, the number of layers of the holes 13 in the HF 10 is five. The holes 13 are formed in layers as described above, and they are arranged so as to form a triangular lattice L. A diameter of each of the holes 13 is d, and a lattice constant of the triangular lattice L, i.e. a distance between centers of the abutting holes 13, is Λ.

In the HF 10, d/Λ being a ratio of d to Λ is set within a range of 0.43±0.10, or preferably within a range of 0.43±0.08, and Λ is set within a range of 10.5 μm to 15 μm. As a result, it is possible to achieve characteristics in that, in a wavelength of 1550 nm, an effective core-area (Aeff) becomes equal to or greater than 130 μm$^2$, a bending loss in a case of bending the optical fiber at a bend diameter of 20 mm becomes equal to or less than 200 dB/m, and operation becomes single-mode. In order to retain better bending property and single-mode operation, it is preferable that the effective core-area is equal to or less than 250 μm$^2$. The HF 10 has low optical nonlinearity realized by the large-Aeff, and even if the HF 10 is wound around a bobbin with a diameter of 20 mm as assumed to be used in cabling, the HF 10 may have a practicable characteristic of bending loss with a degree enabling optical transmission and a characteristic for single-mode operation. Thus, the HF 10 is suitable to be used in optical transmission.

In this description, when a confinement loss of a first high-order propagation mode of a light, i.e. LP11 mode, is equal to or greater than 0.2 dB/m and a confinement loss of a fundamental propagation mode, i.e. LP01 mode, is equal to or less than 0.02 dB/m, the operation of the HF is defined as a single-mode operation. A confinement loss is a loss caused by a part of light propagating in a core portion of an HF leaking from the core portion through gaps between the holes. The value of 0.2 dB/m indicates that a loss as large as 20 dB occurs while light of the LP11 mode propagates in the HF by only 100 m. Therefore, when optical transmission over at least several kilometers is performed while using the HF as an optical transmission path, the LP11 mode will attenuate sufficiently, and only the LP01 mode will propagate substantively.

In the HF 10, the confinement loss of the LP01 mode of light is equal to or less than 0.02 dB/km in the wavelength of 1550 nm, and is sufficiently small to such a degree that has a little influence on the transmission loss.

In the HF 10, it is possible to reduce the microbending loss in the wavelength of 1550 nm to be equal to or less than 0.3 dB/km by enlarging the external diameter (cladding diameter) to be greater than 130 μm.

In Nonpatent Reference 3, it is noted that the microbending loss can be suppressed by expanding the cladding diameter when an Aeff of the solid SIF (step index fiber) having a normal single-peak and step-index-type refractive index profile is enlarged. Accordingly, since it can be considered that the microbending loss can be further suppressed by enlarging the external diameter of the HF having the holes in the cladding region as in the case of the embodiment, it may be possible to obtain a more desirable microbending characteristic by adopting the HF.

In the HF 10, although the number of the hole layers is set as five, it is possible to conveniently increase or decrease the number as long as it is within a range that enables realization of each of the above-described characteristics with respect to the effective core-area, bending loss and single-mode operation characteristic.

Hereinafter, the embodiment will be described in more detail with reference to calculation results from a simulation based on a vector finite element method. In the following, a bending loss indicates a bending loss in a case where the HF is bent at a bend diameter of 20 mm.

Figure 2:
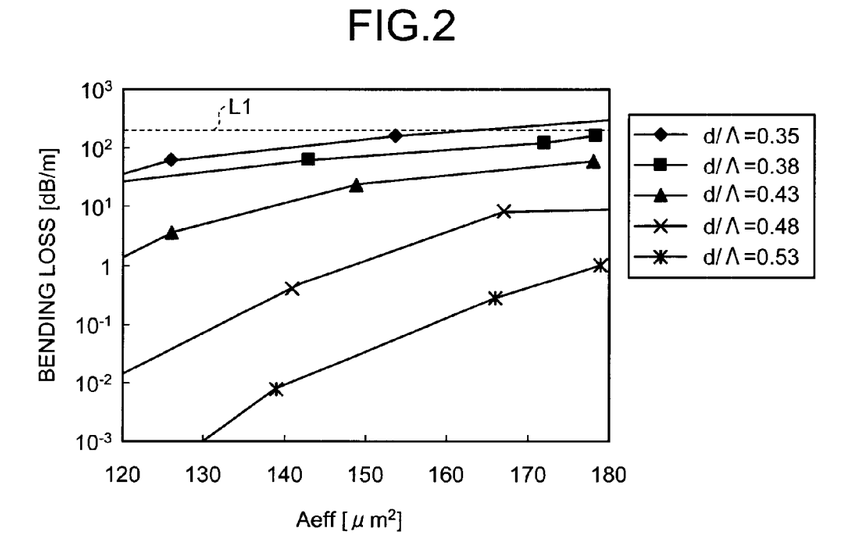
FIG. 2 is a graph showing a relationship between an effective core-area Aeff and a bending loss at the wavelength of 1550 nm with respect to an HF with the same cross-sectional structure as the HF shown in FIG. 1.

Firstly, a relationship between the effective core-area Aeff and the bending loss will be described. FIG. 2 is a graph showing a relationship between the effective core-area Aeff and the bending loss in the wavelength of 1550 nm with respect to an HF with the same cross-sectional structure as the HF shown in FIG. 1. In FIG. 2, d/Λ is set to be within a range of 0.35 to 0.53. Λ is set with respect to each set d/Λ in such a way that the Aeff becomes a value shown in a horizontal axis. In FIG. 2, a line L1 shows a position where the bending loss is 200 dB/m. As shown in FIG. 2, in the HF, as the Aeff becomes larger, the bending loss also becomes larger.

In each data point shown in FIG. 2, when the d/Λ is 0.35, combinations of Λ and Aeff becomes (9 μm, 126.1 μm$^2$) and (10 μm, 153.8 μm$^2$). When the d/Λ is 0.38, combinations of Λ and Aeff are (10 μm, 143.1 μm$^2$), (11 μm, 172 μm$^2$) and (11.2 μm, 178.4 μm$^2$). When the d/Λ is 0.43, combinations of Λ and Aeff are (10 μm, 126 μm$^2$), (11 μm, 149 μm$^2$) and (12 μm, 178 μm$^2$). When the d/Λ is 0.48, combinations of Λ and Aeff are (11 μm, 141 μm$^2$) and (12 μm, 167 μm$^2$). When the d/Λ is 0.53, combinations of Λ and Aeff are (11.4 μm, 139 μm$^2$), (12.5 μm, 166 μm$^2$) and (13 μm, 179 μm$^2$).

When the d/Λ is set to 0.33, and if the Λ is 9 μm, the Aeff is 132.61 μm$^2$ and the macrobending loss is 153.68 dB/m.

Because an HF of which optical nonlinearity is suppressed more than in a conventional optical fiber is suitable for a long-haul optical transmission, it is preferable to set the Aeff to be equal to or greater than 130 μm$^2$. Furthermore, considering installation of the HF as an optical transmission path, it is preferable that the bending loss is equal to or less than 200 dB/m. As shown in FIG. 2, as long as the d/Λ is equal to or greater than 0.33, or preferably equal to or greater than 0.35, by conveniently selecting the Λ from within a range of 10.5 μm to 15 μm, it is possible to suppress the bending loss to be equal to or less than 200 dB/m while the Aeff is equal to or greater than 130 μm$^2$.

As disclosed by Nonpatent Reference 1, as the d/Λ becomes larger from 0.43, the ESM characteristic becomes impaired and the confinement loss of the LP11 mode reduces. In this respect, a value of the d/Λ is set to be equal to or less than 0.53, or preferably equal to or less than 0.51, in order to let the confinement loss of the LP11 mode become equal to or greater than 0.2 dB/km (0.0002 dB/m).

Accordingly, the d/Λ is set within a range of 0.43±0.1, or preferably a range of 0.43±0.08. In these ranges of the d/Λ, in order to design the bending loss to be equal to or less than 200 dB/m, it is preferable to design the Aeff to be equal to or less than 250 μm$^2$.

Next, a relationship between the effective core—area Aeff and the bending loss with respect to the HF with the d/Λ of 0.43 shown in FIG. 2 and a conventional optical fiber (SIF) will be compared and examined. In the SIF for comparison, a cutoff wavelength is set as 1.53 μm being a shorter wavelength end of a waveband which is so called a C band (1.53 μm to 1.56 μm). In the following, the SIF will be simply referred to as SIF all along.

Figure 3:
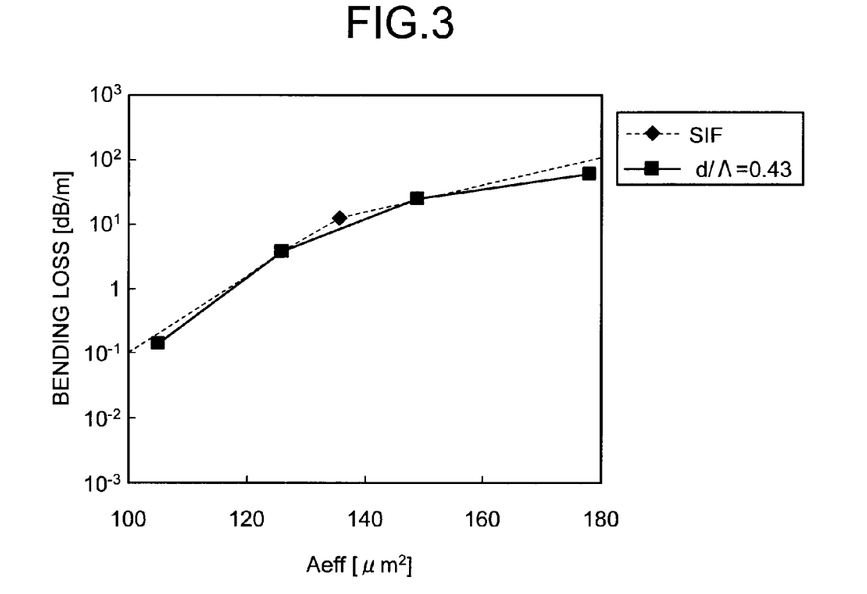
FIG. 3 is a graph showing a relationship between an effective core-area Aeff and a bending loss in the wavelength of 1550 nm with respect to the HF of which d/Λ is 0.43 shown in FIG. 2 and an SIF for comparison.

FIG. 3 is a graph showing a relationship between the effective core-area Aeff and the bending loss in the wavelength of 1550 nm with respect to the HF of which d/Λ is 0.43 shown in FIG. 2 and the SIF for comparison. In FIG. 3, a core diameter and a relative index difference Δ between the core portion and the cladding portion of the SIF are adjusted so that the cutoff wavelength is maintained at the wavelength of 1.53 μm. The Aeff and the bending loss are calculated using the adjusted core diameter and the adjusted relative index difference Δ.

As shown in FIG. 3, Aeff-bending loss characteristics of both the HF with the d/Λ of 0.43 and the SIF correspond with each other. That is, in the embodiment, the HF with the d/Λ of 0.43 can realize the same Aeff-bending loss characteristic as in the conventional SIF. Since the HF with the d/Λ of 0.43 has the ESM characteristic as described above, the HF is not subjected to such limitation as the cutoff wavelength should be 1.53 μm as in the conventional SIF. Therefore, this HF is capable of demonstrating a single-mode operation even with a wavelength that is equal to or less than 1.53 μm, and thus the HF is even more suitable for wideband optical transmission.

Next, wavelength dispersion characteristics of the HF according to the embodiment will be described in detail. The wavelength dispersion characteristics of the HF according to the embodiment depend strongly on material dispersion characteristics of the glass material of the HF. In the wavelength of 1550 nm, an absolute value of wavelength dispersion is equal to or less than 30 ps/nm/km, and a dispersion slope value is within a range of 0.06±0.02 ps/nm$^2$/km. These wavelength dispersion value and dispersion slope value are characteristics that are comparatively close to those of a single-mode optical fiber (SMF) as defined in ITU-T G.652. A DPS (Dispersion Per Slope) value being a value of the wavelength dispersion value divided by the dispersion slope value according to the embodiment is equal to or greater than 360 nm in the wavelength of 1550 nm, and is greater than 300 nm which is a standard DPS value of the SMF. Accordingly, when the HF according to the embodiment is used for an optical transmission path, it is possible to easily achieve dispersion compensation using a dispersion-compensating optical fiber for the SMF.

Figure 4:
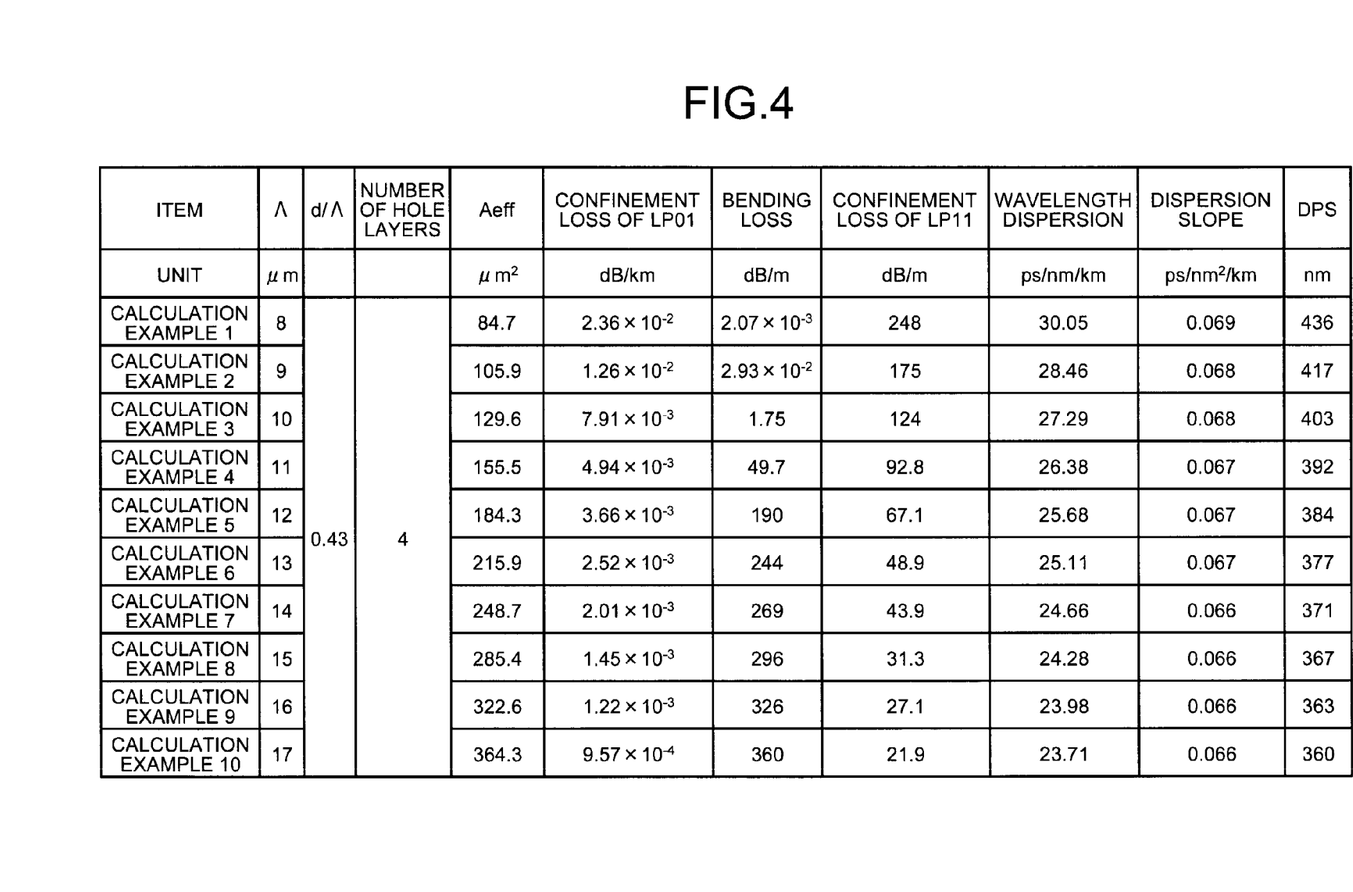
FIG. 4 is a table showing calculation examples 1 to 10 that express a relationship between design parameters and each optical characteristic in the wavelength of 1550 nm with respect to an HF having the same cross-sectional structure as the HF shown in FIG. 1 except for the number of hole layers being four.

Next, the embodiment will be further described with reference to more specific calculation examples. FIG. 4 is a table showing calculation examples 1 to 10 that express a relationship between design parameters and each optical characteristic in the wavelength of 1550 nm with respect to an HF having the same cross-sectional structure as the HF shown in FIG. 1 except for the number of hole layers being four. In FIG. 4, as for the design parameters (structural parameters), the d/Λ is set as 0.43, and the Λ is set to be within a range of 8 μm to 17 μm. With respect to confinement loss, "LP01" denotes a confinement loss in the LP01 mode, and "LP11" denotes a confinement loss in the LP11 mode. When the d/Λ in FIG. 4 is 0.43, the bending loss tends to increase in a vibrating manner corresponding to the increase of the Λ. Therefore, in FIG. 4, the vibrating values are approximated at an approximated curve to be shown as values in the approximated curve.

As shown in the fourth and fifth calculation examples of FIG. 4, when the d/Λ is 0.43 and the Λ is 11 μm or 12 μm, the effective core-area Aeff is equal to or greater than 130 μm$^2$, and the bending loss of the LP01 mode is equal to or less than 200 dB/m. Furthermore, the confinement loss of the LP01 mode is sufficiently reduced to be equal to or less than $4.94*10^{-3}$ dB/km to such an extent that the confinement loss does not influence the transmission loss. Moreover, the confinement loss of the LP11 mode rises sufficiently to be equal to or greater than 67.1 dB/m which is sufficiently greater than 0.2 dB/m, whereby a sufficient single-mode operation can be realized.

Both of the fourth and fifth calculation examples can obtain desirable values in which the absolute value of the wavelength dispersion is equal to or less than 30 ps/nm/km, the dispersion slope value is within the range of 0.06±0.02 ps/nm²/km, and the DPS value is equal to or greater than 360 nm.

Figure 5:
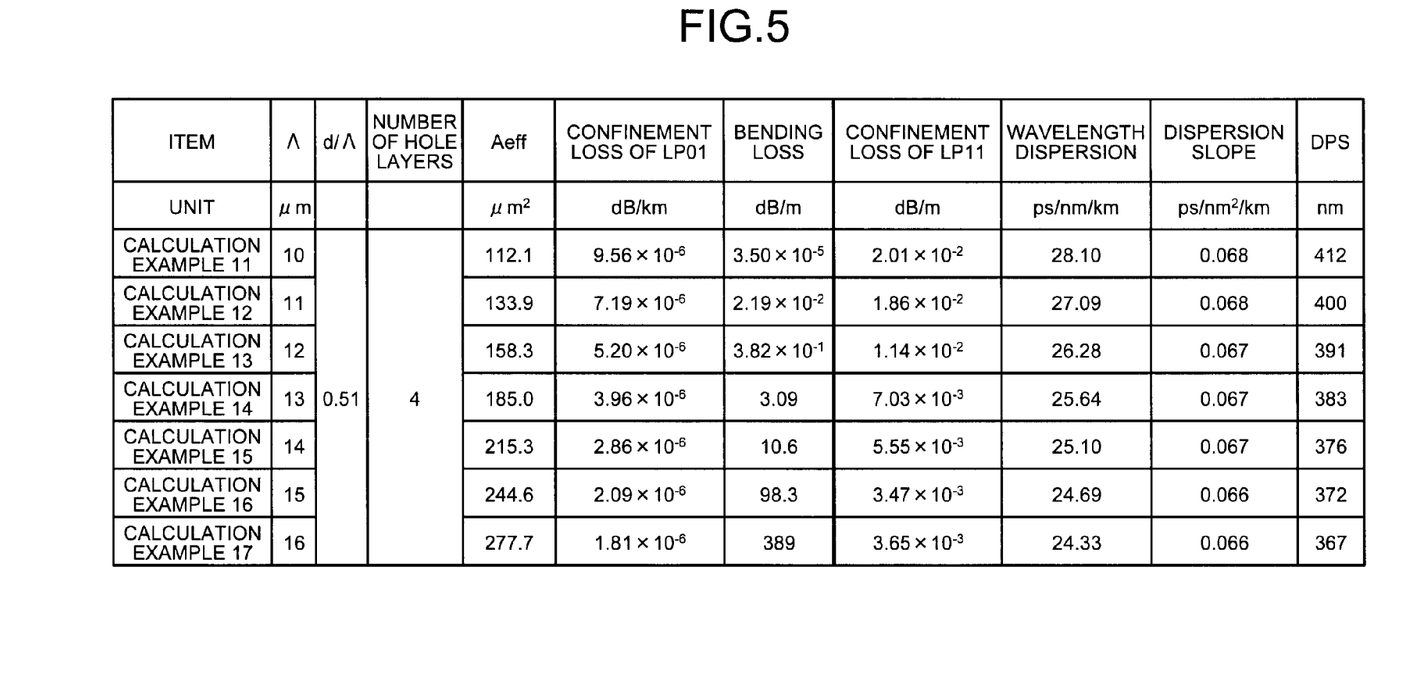
FIG. 5 is a table showing calculation examples 11 to 17 that express a relationship between the design parameters and each optical characteristic in the wavelength of 1550 nm in a case where the d/Λ is set as 0.51 with respect to the HF having the same cross-sectional structure as the HF shown in FIG. 1 except for the number of hole layers being four.

FIG. 5 is a table showing calculation examples 21 to 18 that express a relationship between the design parameters and each optical characteristic in the wavelength of 1550 nm in a case where the d/Λ is set as 0.51 with respect to the HF having the same cross-sectional structure as the HF 10 shown in FIG. 4 while the number of hole layers been four. In FIG. 5, the Λ is set within a range of 10 μm to 16 μm.

As shown in FIG. 5, when the d/Λ is set as 0.51, if the number of the hole layers is four and the Λ is within a range of 11 μm to 15 μm, the confinement loss of the LP11 mode is as small as to be equal to or less than $1.86*10^{-2}$ dB/m, which thus it makes impossible to secure a sufficient single-mode operation.

Figure 6:
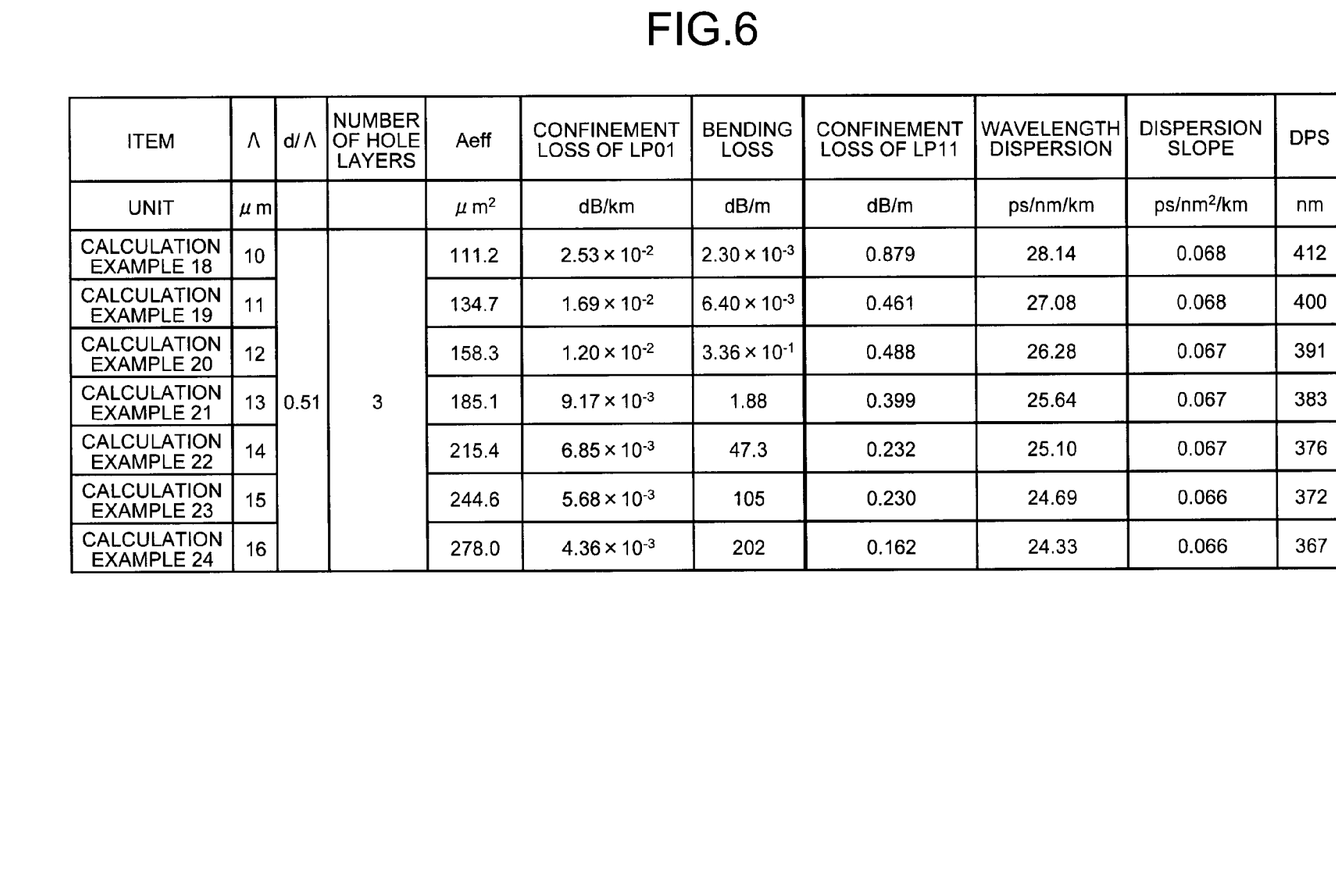
FIG. 6 is a table showing calculation examples 18 to 24 that express a relationship between the design parameters and each optical characteristic in the wavelength of 1550 nm with respect to an HF having the same parameters shown in FIG. 5 except for the number of hole layers being reduced to three.

On the other hand, FIG. 6 is a table showing calculation examples 18 to 24 that express a relationship between the design parameters and each optical characteristic in the wavelength of 1550 nm with respect to an HF having the same parameters shown in FIG. 5 except for the number of hole layers being reduced to three.

As shown in FIG. 6, when the d/Λ is 0.51, if the number of the hole layers is set to be three and a case that the Λ is set within a range of 11 μm to 15 μm as shown in the calculation examples 19 to 23, the effective core-area Aeff is as large as to be equal to or greater than 130 μm² while the bending loss of the LP01 mode is equal to or less than 200 dB/m. Furthermore, the confinement loss of the LP01 mode is sufficiently reduced to be equal to or less than $1.69*10^{-2}$ dB/km to such an extent that the confinement loss does not influence the transmission loss. Moreover, the confinement loss of the LP11 mode rises sufficiently to be equal to or greater than 0.23 dB/m, whereby a sufficient single-mode operation can be realized.

Any one of the calculation examples 19 to 23 can obtain desirable values in which the absolute value of the wavelength dispersion is equal to or less than 30 ps/nm/km, the dispersion slope value is within the range of 0.06±0.02 ps/nm²/km, and the DPS value is equal to or greater than 360 nm.

As described above, by reducing the number of the hole layers while maintaining the value of the d/Λ constant, it is possible to increase the confinement loss of the LP11 mode, and thus the confinement loss of the LP01 mode increases. Accordingly, it is preferable to set the number of the hole layers with respect to adjustment of the d/Λ and the Λ so that the confinement losses of the LP11 mode and the LP01 mode become desirable values.

Figure 7:
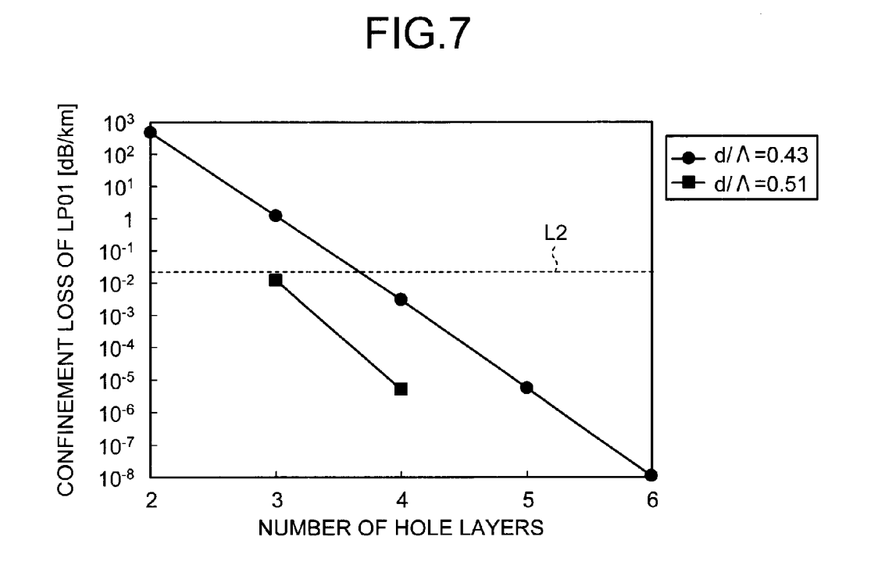
FIG. 7 is a graph showing a relationship between the number of hole layers and the confinement loss of LP01 mode in the wavelength of 1550 nm with respect to an HF having the same cross-sectional structure as the HF shown in FIG. 1.

FIG. 7 is a graph showing a relationship between the number of hole layers and the confinement loss of LP01 mode in the wavelength of 1550 nm about an HF which has the same cross-sectional structure as the HF shown in FIG. 1. In FIG. 7, the d/Λ is set as 0.43 or 0.51, and the Λ is set as 12 μm. A line L2 shows a position where the confinement loss is 0.02 dB/m. In the known HF, a minimum transmission loss is about 0.2 dB/km. Therefore, it can be considered that if the confinement loss of the LP01 mode is equal to or less than 0.02 dB/km, the value of the confinement loss is sufficiently small to the extent of not influencing the transmission loss.

In the HF shown in FIG. 7, even if the number of the hole layers is set as three while the d/Λ is set as 0.51, the confinement loss of the LP01 mode will be 0.012 dB/km which is equal to or less than 0.02 dB/km, and will be sufficiently small to the extent of not influencing the transmission loss. When the d/Λ is set as 0.43, it is possible to realize the confinement loss that is equal to or less than 0.02 dB/km by setting the number of the hole layers to be equal to or greater than 4.

In FIG. 7, although the Λ is set as 12 μm, the value of the confinement loss of each mode will be almost the same even if the Λ is set as a different value within the range of 11 μm to 15 μm.

Next, the embodiment will be described further with reference to examples. As the examples 1 to 7, HFs were fabricated by the known stacking-and-drawing method using solid glass rods and hollow glass capillaries tube both of which are made of pure silica glass. Design parameters for the HFs of the examples 1 to 7 were set as follows. In the example 1, the d/Λ was set to 0.43, the Λ was set to 10.5 μm, and the external diameter (cladding diameter) was set to 186 μm. In the example 2, the d/Λ was set to 0.34, the Λ was set to 10.2 μm, and the external diameter was set to 186 μm. In the example 3, the d/Λ was set to 0.43, the Λ was set to 10.6 μm, and the external diameter was set to 215 μm. In the example 4, the d/Λ was set to 0.43, the Λ was set to 10.9 μm, and the external diameter was set to 186 μm. In the example 5, the d/Λ was set to 0.43, the Λ was set to 10.9 μm, and the external diameter was set to 186 μm. In the example 6, the d/Λ was set to 0.43, the Λ was set to 10.9 μm, and the external diameter was set to 161 μm. In the example 7, the d/Λ was set to 0.45, the Λ was set to 11.4 μm, and the external diameter was set to 186 μm. In any of the examples 1 to 4, the number of the hole layers was set to five. In any of the examples 5 to 7, the number of the hole layers was set to four.

Conventional solid SIFs (reference examples 1 to 3) were fabricated by the known VAD method for comparisons especially with respect to characteristics of the microbending loss in the examples 1 to 7. In the SIFs according to the reference examples 1 to 3, the core diameter and the relative index difference Δ were set so that the cutoff wavelength became 1.53 μm, the effective core-area Aeff became 114.2 μm² (the reference example 1), 130 μm² (the reference example 2), or 115 μm² (the reference example 3), and the external diameters were set to 186 μm. Furthermore, in order to make constituent material of the core portions of the SIFs the same as that of the core portions of the HFs according to the example 1 to 7, the core portions were formed of pure silica and the cladding portions were formed of fluorine-doped silica.

Figure 8:
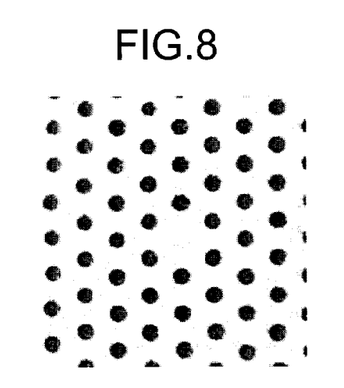
FIG. 8 is a diagram showing a magnified photograph of a cross-section of a fabricated HF according to the example 1.

FIG. 8 is a diagram showing a magnified photograph of a cross-section of a fabricated HF according to the example 1. As shown in FIG. 8, it was observed that in the fabricated HF, all of the hole structures did not break and hole diameters were almost even.

Figure 9:
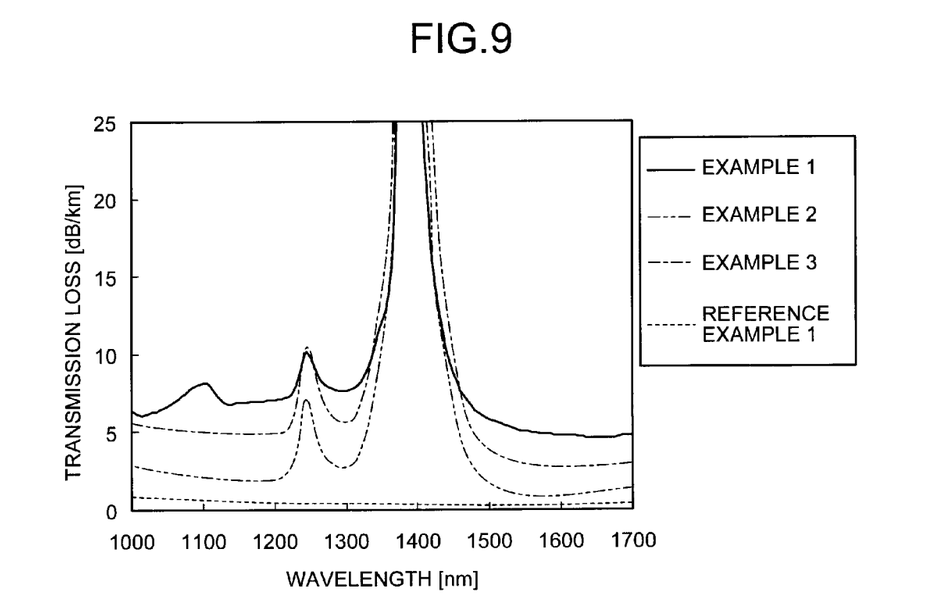
FIG. 9 is a graph showing spectra of transmission loss of HFs according to the examples 1 to 3 and the SIF according to the reference example 1.

FIG. 9 is a graph showing spectra of the transmission loss of the HFs according to the examples 1 to 3 and the SIF according to the reference example 1. In FIG. 9, a peak of the transmission loss around a wavelength of 1400 nm is due to absorption of hydroxyl in the optical fiber. As shown in FIG. 9, it was observed that any of the HFs according to the examples 1 to 3 and the SIF according to the reference example 1 had proper transmission loss characteristics with no particular problem. For example, the transmission loss in the wavelength of 1550 nm with respect to the HF according to the example 1 was 5.02 dB/km.

Figure 10:
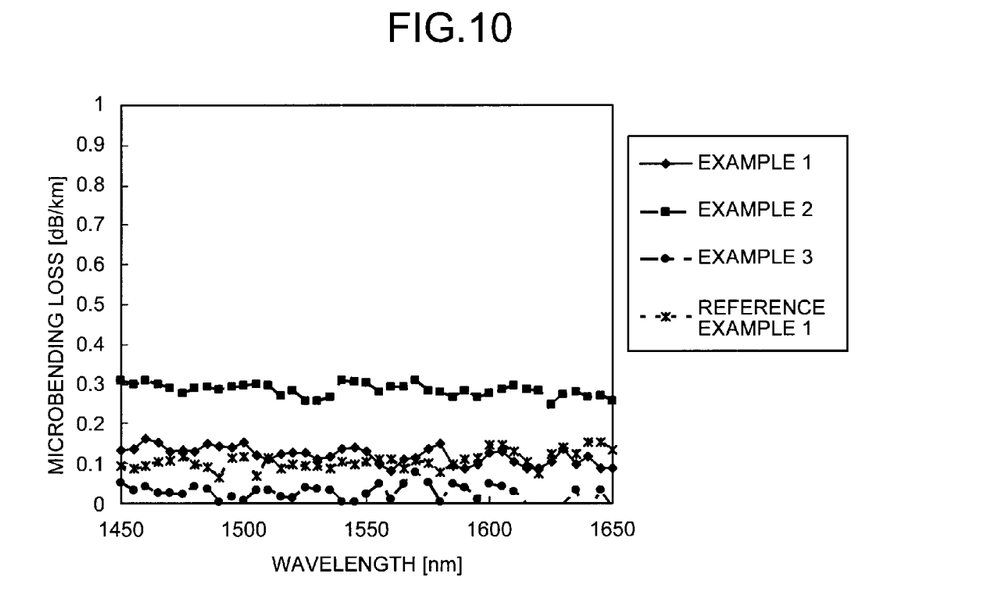
FIG. 10 is a graph showing spectra of microbending loss of the HFs according to the examples 1 to 3 and the SIF according to the reference example 1.

Next, FIG. 10 is a graph showing spectra of microbending loss of the HFs according to the examples 1 to 3 and the SIF according to the reference example 1. The microbending loss was defined as a transmission loss difference between a measured transmission loss when each optical fiber was wound around a bobbin around which a number #1000 sandpaper was wrapped and a measured transmission loss when each optical fiber was wound around the same bobbin but without any sandpaper being wrapped. The diameter of the bobbin was 160 mm. In the present description, a microbending loss defined as the above method is called a microbending loss by second measurement method. A microbending loss by second measurement method is preferable because it is much less influenced by bending loss.

As shown in FIG. 10, it was observed that any of the HFs according to the examples 1 to 3 and the SIF according to the reference example 1 had proper microbending loss characteristics with no particular problem.

Figure 11:
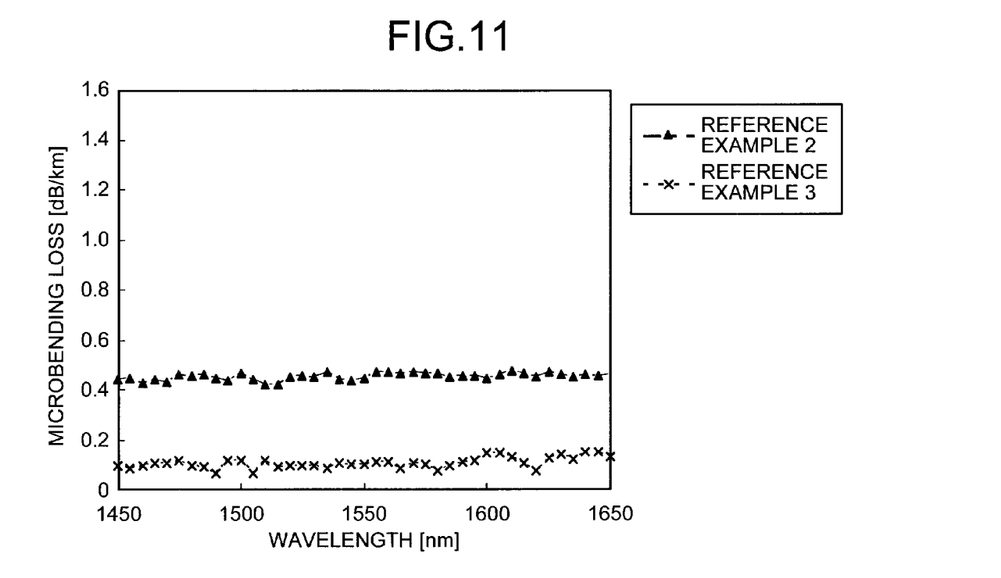
FIG. 11 is a graph showing spectra of microbending loss of the SIFs according to the reference examples 2 and 3.
Figure 12:
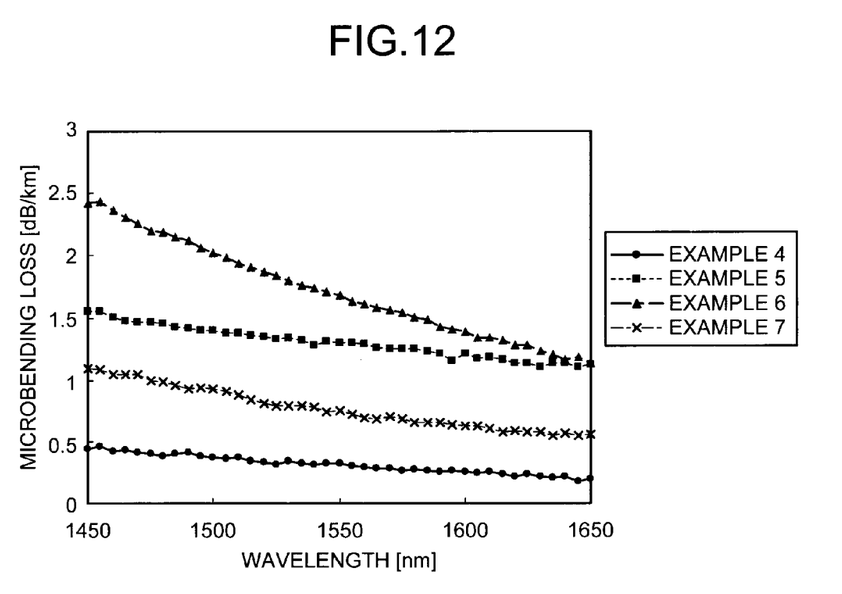
FIG. 12 is a graph showing spectra of microbending loss of the HFs according to the examples 4 to 7.

Next, FIG. 11 is a graph showing spectra of microbending loss of the SIFs according to the reference examples 2 and 3. FIG. 12 is a graph showing spectra of microbending loss of the HFs according to the examples 4 to 7. The microbending loss was defined as a transmission loss difference between a measured transmission loss when each optical fiber was wound around a bobbin around which a number #1000 sandpaper was wrapped and a measured transmission loss when each optical fiber was unwound from around the bobbin and was bundled in a winding. The diameter of the bobbin was 160 mm. In the present description, a microbending loss defined as the above method is called a microbending loss by first measurement method.

For each of the first and second measurement method, a diameter of a bobbin to be used is not limited. The diameter is preferably equal to or more than 80 mm, or equal to or less than 200 mm because a bending loss is small when the bobbin having such a diameter is used.

As shown in FIGS. 11 and 12, although the microbending loss in each of the HFs according to the examples 4 to 7 is somewhat greater than that in each of the SIFs according to the reference examples 2 and 3, the microbending loss in each of the HFs according to the examples 4 to 7 is a proper value with no particular problem for practical use.

Figure 13:
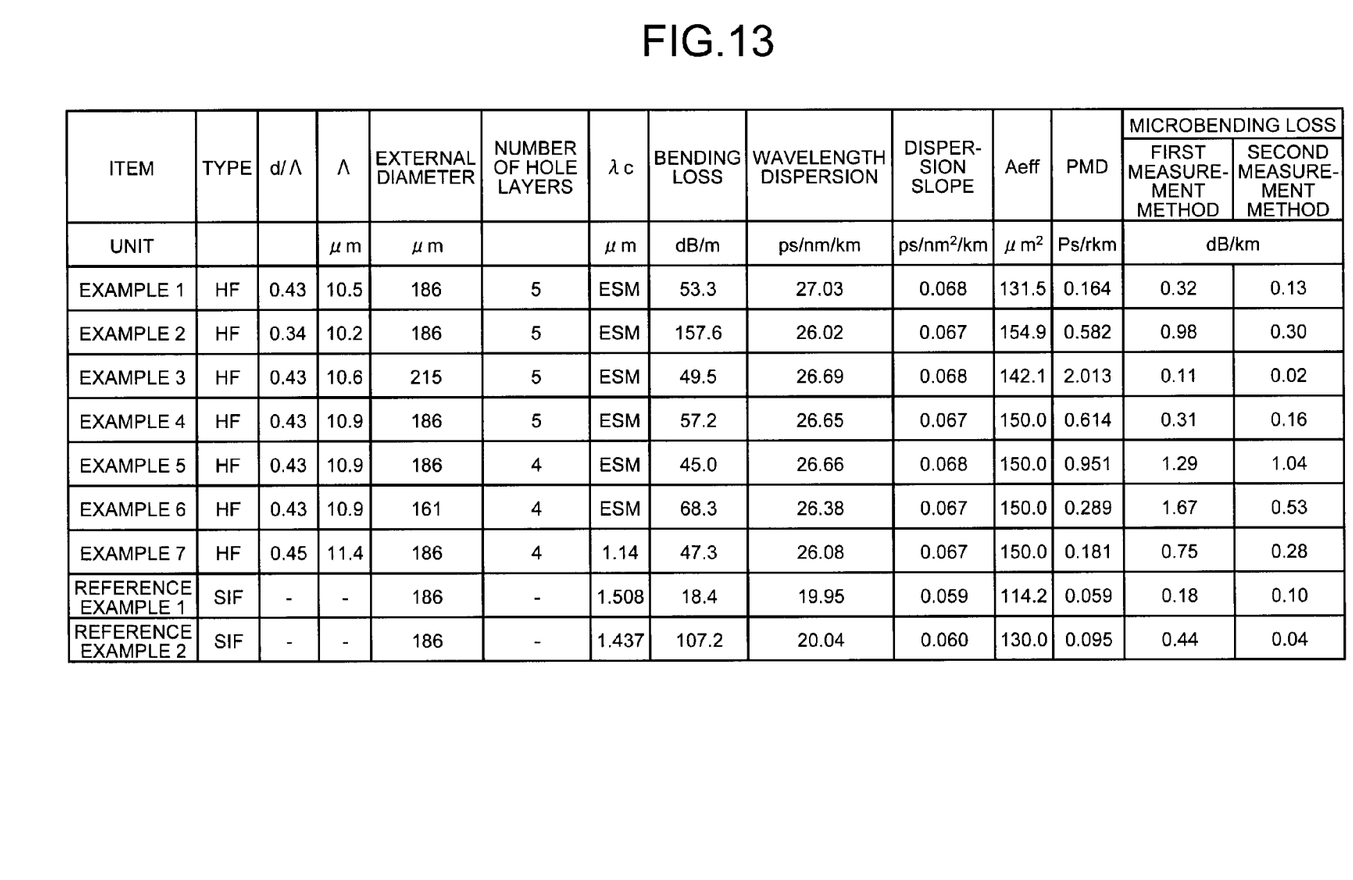
FIG. 13 is a table showing design parameters and each observed optical characteristic of the HFs according to the examples 1 to 7 and the SIF according to the reference examples 1 and 2.

Furthermore, FIG. 13 is a table showing design parameters and each observed optical characteristic of the HFs according to the examples 1 to 7 and the SIF according to the reference examples 1 and 2. In FIG. 13, "λc" indicates the cutoff wavelength, and "ESM" indicates the ESM characteristic being realized. "PMD" indicates a polarization mode dispersion. Each optical characteristic, except for the cutoff wavelength λc, indicates a value in the wavelength of 1550 nm. Both of microbending losses by first measurement method and by second measurement method are shown in FIG. 13.

As shown in FIG. 13, any of the HFs according to the examples 1 to 7 was able to realize approximately the characteristics as designed in which the ESM characteristic was being realized, the Aeff was equal to or greater than 130 μm$^2$, and the bending loss was equal to or less than 200 dB/m, in the wavelength of 1500 nm. Each of the HFs according to the examples 1 to 7 was able to obtain desirable values in which the absolute value of wavelength dispersion value was equal to or less than 30 ps/nm/km, and the dispersion slope value was within a range of 0.06±0.02 ps/nm$^2$/km, in the wavelength of 1550 nm. Furthermore, in each of the HFs according to the examples 1 to 7, the DPS value was also a desirable value such as being equal to or greater than 360 nm. Moreover, in each of the HFs according to the examples 1 to 7, the PMD was also a problem-free value such as being about equal to or less than 2 ps/rkm.

Moreover, in each of the HFs according to the examples 1 to 7, the microbending loss by first measurement method was preferably equal to or less than 2.0 dB/km, or more preferably equal to or less than 1.0 dB/km. Furthermore, in each of the HFs according to the examples 1 to 7, the microbending loss by second measurement method was preferably equal to or less than 1.5 dB/km, or more preferably equal to or less than 0.3 dB/km. An HF having microbending loss by second measurement method of equal to or less than 1.5 dB/km is desirable because such a value is a proper value with no particular problem for practical use. An HF having microbending loss by second measurement method of equal to or less than 0.3 dB/km is more desirable because such a value of the microbending loss is almost the same as that of the conventional transmission loss of the optical fiber of about 0.2 dB/km and does not influence the transmission loss so much.

Comparing the HF according to the example 1 and the SIF according to the reference example 1, although the external diameter were equal and the Aeff of the HF was larger than that of the SIF, almost the same microbending losses by second measurement method were able to be realized.

Comparing the HF according to the example 2 and the SIF according to the reference example 1, although the external diameters were equal and the Aeff of the HF was sufficiently larger than that of the SIF, the microbending loss by second measurement method of the HF was suppressed and exhibited a problem-free value such as being equal to or less than 0.3 dB/km.

With respect to the HF according to the example 3, the external diameter of the HF according to the example 3 was enlarged to be larger than that of the HF according to the example 1. It was thereby confirmed that the microbending loss by second measurement method was extremely low as 0.02 dB/km, and was reduced to a degree where it can be practically considered that the loss due to microbending did not occur.

Comparing the HF according to the example 4 and the HF according to the example 5, both of the microbending losses by first measurement method and second measurement method of the HF according to the example 4 were smaller. The HF according to the example 4 and the HF according to the example 5 have the same values of d/Λ, Λ, and external diameter. However, the HF according to the example 4 has the larger number of hole layers. It is supposed that the hole layers have the function of cushion for relaxing the stress from outside to the core portion. It is supposed that the HF according to the example 4 has smaller microbending loss than that of the HF according to the example 5 because the HF according to the example 4 has the larger number of hole layers and the function of cushion thereof is more effective.

Comparing the HF according to the example 5 and the HF according to the example 7, both of the microbending losses by first measurement method and second measurement method of the HF according to the example 7 were smaller. The HF according to the example 5 and the HF according to the example 7 have the same values of external diameter and the same number of hole layers. However, the HF according to the example 7 has the larger d/Λ. In the HF according to the example 7, the cross section of the holes which occupies the cross section of the cladding portion is large because the d/Λ is large. Therefore it is supposed that the function of cushion of the holes is more effective and that accordingly, the microbending loss of the HF according to the example 7 is smaller than that of the HF according to the example 5. It is preferable that the value of d/Λ is set so that the HF does not propagate light in a predetermined wavelength in multimode.

The holey fiber according to the embodiment of the present invention can realize low optical nonlinearity and suppression of macrobending loss while realizing a single-mode operation, whereby it is suitable to be used in optical transmission.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. A holey fiber comprising:
    a core portion located at a center of the holey fiber; and
    a cladding portion located around the core portion, the cladding portion having holes formed in layers around the core portion, wherein the holes are arranged so as to form a triangular lattice while d/Λ is within a range of 0.33 to 0.43, Λ is within a range of 10.5 micrometers to 15 micrometers when a hole diameter is d in micrometer and a lattice constant of the triangular lattice is Λ in micrometer, and in a wavelength of 1550 nanometer, an effective core-area is equal to or greater than 130 $\mu m^2$, a bending loss in a case of bending the holey fiber at a bend diameter of 20 millimeters is equal to or less than 200 dB/m, and the holey fiber demonstrates a single-mode operation, and
    a microbending loss which is defined as a transmission loss difference between a transmission loss of the holey fiber being wounded around a bobbin around which a sandpaper is wrapped and a transmission loss of the holey fiber being wounded around the bobbin without any sandpaper being wrapped is equal to or less than 1.5 dB/km in the wavelength of 1550 nanometers.

2. The holey fiber according to claim 1, wherein a confinement loss of an LP11 mode in the wavelength of 1550 nanometers is equal to or more than 31.3 dB/m.

3. The holey fiber according to claim 1, wherein the effective core-area in the wavelength of 1550 nanometers is equal to or less than 250 $\mu m^2$.

4. The holey fiber according to claim 1, wherein the d/Λ is within a range of 0.35 to 0.43.

5. The holey fiber according to claim 1, wherein a confinement loss of a LP01 mode in the wavelength of 1550 nanometers is equal to or less than 0.02 dB/km.

6. The holey fiber according to claim 1, wherein the microbending loss is equal to or less than 0.3 dB/km.

7. The holey fiber according to claim 1, wherein an external diameter thereof is greater than 130 micrometers.

8. The holey fiber according to claim 1, wherein
    in a wavelength of 1550 nanometer, an absolute value of a wavelength dispersion is equal to or less than 30 ps/nm/km, a dispersion slope value is within a range of 0.06±0.02 ps/nm$^2$/km, and a dispersion per slope value being a value of the wavelength dispersion value divided by the dispersion slope value is equal to or greater than 360 nanometers in the wavelength of 1550 nanometers.

* * * * *